2,381,385

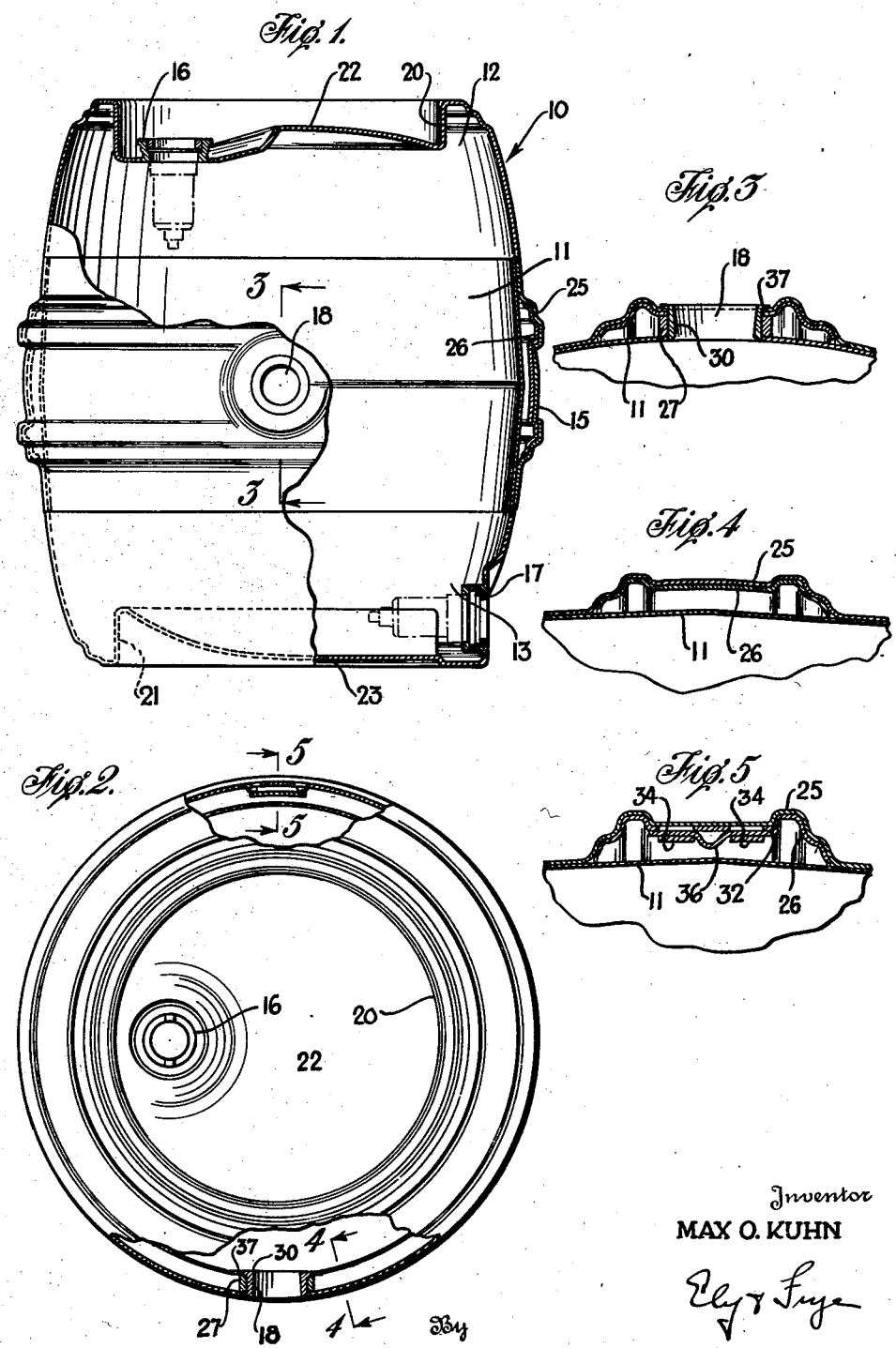
Aug. 7, 1945.    M. O. KUHN    2,381,385
METHOD OF CONSTRUCTING CONTAINERS
Filed Feb. 27, 1942    2 Sheets—Sheet 1
Inventor
MAX O. KUHN Aug. 7, 1945.  M. O. KUHN  2,381,385
METHOD OF CONSTRUCTING CONTAINERS
Filed Feb. 27, 1942  2 Sheets-Sheet 2
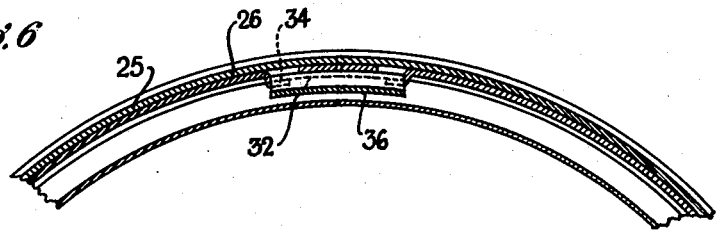
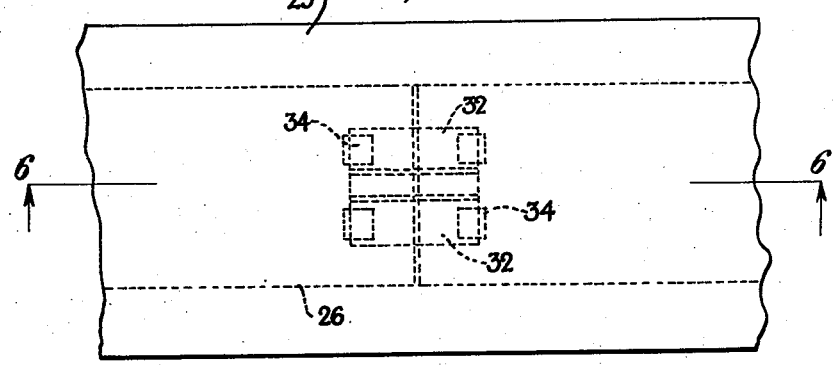
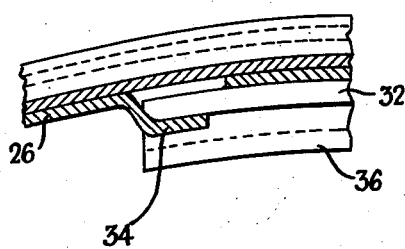
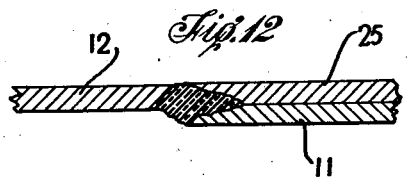
Inventor
MAX O. KUHN
By Ely & Frye
Attorneys Patented Aug. 7, 1945

UNITED STATES PATENT OFFICE 2,381,385

METHOD OF CONSTRUCTING CONTAINERS

Max O. Kuhn, Cuyahoga Falls, Ohio, assignor to The Firestone Tire & Rubber Company, Akron, Ohio, a corporation of Ohio Application February 27, 1942, Serial No. 432,673

3 Claims. (Cl. 113—120)

This application relates to methods of manufacturing single walled metallic containers.

A primary object of the invention resides in the provision of an improved method of manufacturing containers mainly consisting of a non-corrosive metal, but which partly consist of a corrosive metal, said corrosive metal being protected, not only from liquid contents within the barrel, but also from direct contact with the atmosphere.

Another important object of the invention relates to an improved method of welding multiple container sections to provide a unitary structure.

Still another object is to provide an improved method of applying a girth band to a barrel-like container.

Further objects are to improve and simplify methods of applying a girth band to a barrel-like container.

Further objects are to improve and simplify methods of assembling containers, and to reduce manufacturing costs; with special reference to metal barrels.

Other objects and advantages will appear to persons skilled in the art as the description proceeds.

In the drawings:

Fig. 1 is a view, partly in elevation and partly in section, of a container having the invention incorporated therein.

Fig. 2 is a view, largely in plan, but partially in fragmentary section, of the container shown in Fig. 1.

Fig. 3 is taken along line 3—3, Fig. 1.

Fig. 4 is taken along line 4—4, Fig. 2.

Fig. 5 is taken along line 5—5, Fig. 2.

Fig. 6 is a fragmentary view in section showing the manner in which the ends of the girth band reinforcing ring are connected.

Fig. 7 is a fragmentary view in plan of the girth band, with its supporting ring and the supporting ring connections shown dotted.

Fig. 8 is an enlarged sectional detail of the girth band and reinforcing ring.

Fig. 9 is a fragmentary section showing a marginal portion of the center container section and a marginal portion of the contiguously associated girth band.

Fig. 10 illustrates the members of Fig. 9 joined by seam welding.

Fig. 11 illustrates the seam welded members of Fig. 10 marginally grounded to provide a planar abutting surface.

Fig. 12 illustrates in fragmentary section, an end closure member abutted and welded to the members of Fig. 11.

Like parts are identified with the same reference characters throughout the drawings and description.

As best shown in Fig. 1, a single walled, substantially constant volume container 10 comprises an annular center section 11 and a pair of cup-shaped members 12 and 13 applied to each end thereof in bonded relation thereto. A girth band 15 is applied to the peripheral surface of center section 11, in a manner hereinafter described, to strengthen the container and to permit easy rolling thereof during transportation and handling. Suitable fluid transfer ports are provided as by tap structures 16 and 17 and bung structure 18. The container sections 12 and 13 have double walled chimes 20 and 21, and integrally connected indented contoured heads 22 and 23. The heads of the container sections are reinforced against localized outward deformation by reason of their curved contour which results in increased rigidity thereof. The container end sections and the fluid transfer ports herein shown are similar to those illustrated in my co-pending application, Serial Number 359,673, filed October 4, 1940, Pat. No. 2,354,425, and entitled "Container and method of manufacture thereof."

The advantages of constructing a container for liquids, for example, a beer barrel, out of non-corrosive metal are well known. If a metal is used which corrodes upon contact of the fluid contents therewith, it is, of course, necessary to completely protect the interior container walls from such contact. It is general practice to apply a pitch lining or the like to containers stamped from ordinary sheet stock. The objections to such a construction are obvious, since rough handling in transportation is apt to break loose some of the container lining, especially if the wall is dented inwardly, allowing contact between the metal and the container contents. It is generally accepted that the most satisfactory container for the transportation and storage of beverages is the single wall container if properly designed to withstand shocks of transportation and handling. The provision of a rugged girth band is desirable for ease of handling and protection of the center container portion. It has been the practice heretofore to provide a girth band of the same material throughout the container; however a substantial reduction in the cost of manufacture may be effected through the provision of a two-part girth band 15 comprising an outer band 25 of lighter weight material than required to sustain the shocks to which the container is normally subjected, the outer band being of the same material as the container, and an inner band 26 of ordinary sheet steel or the like, the inner band 26 being maintained expanded against the inner wall of band 25. Band 25 is marginally bonded to the central container section 11 in fluid sealing relation therewith to isolate the inner band 26, which is subject to corrosion from contact with the liquid contents of the container.

The outer band is preferably formed in the following manner. A strip of non-corrosive metal is shaped to form a cylindrical ring, with abutted ends welded. The ring is then expanded into rough shape by internal dies operating to stretch the metal outwardly into general conformity with its ultimate contour as shown in Fig. 1. The ring is then cold rolled to finished shape, after which it is again expanded, by employment of internal dies or the like, to proper size. Reinforcing ring 26 is preformed for snug engagement with the inner wall of ring 25, ring 26 being of split ring form with the ends thereof joined by connector plate 32 to impart an expansive urge thereto. Ring 26 is installed prior to the peripheral application of the girth band to the center section. Split ring 26 is contracted to allow disposition within the girth band, after which connector plate 32 is inserted between the offset rim end portions 34 by reason of the plate being longitudinally bowed to permit said insertion. Suitable pressure is then applied to the connector plate to remove the longitudinal bow, therein expanding the ends thereof into pressure engagement with the rim ends to provide a permanent expansive bias to maintain the reinforcing ring 26 engaged with the girth band. Plate 32 is constrained against lateral displacement by a longitudinally disposed center rib 36, Fig. 5, the rib also providing reinforcing means for the plate.

The bung port structure 18, Figs. 1, 2 and 3 is assembled in the following manner. Prior to assembly of ring 26 within ring 25, a bung support ring 27 is welded to ring 26, preferably in the position shown, to extend inwardly from the ring. Upon the assembly of the two rings, outer ring 25 is stitch-welded to ring 26 throughout the area adjacent the bung support ring 27. The wall areas within the rings are then punched out to provide bung apertures, and a bung insert 30 of non-corrodible metal is inserted within the bung aperture, said insert having an outer radial lip 37 in sealed engagement with the outer band 25.

The next step in the construction of the container constitutes assembly of center section 11 which is formed by shaping a metal band into cylindrical form, welding the abutted ends thereof to form a ring, applying the above described girth band assembly thereover, and centrally expanding the cylinder into the shape shown in Fig. 1, with marginal areas of the center section snugly engaging marginal areas of outer ring 25. Center section 11 is formed from a strip of metal somewhat wider than the ultimate width of the section, for reasons later described. The marginal portions of center section 11 are then bonded to the marginal portions of ring 25, preferably by means of electric seam welding. Figs. 9, 10 and 11 illustrate in fragmentary detail said marginal portions during the stages of assembly. Fig. 9 shows the margins in clamped assembly, while Fig. 10 shows portions thereof integrally bonded, as by electric seam welding. The margins of the section 11 and girth band 25 are next trimmed off, as by grinding, to effect a clean edge with welded parts exposed throughout the edge thereof, the trimmed edge being at right angles to the axis of the section.

The central portion of the container is now ready to receive the container end portions which are drawn into abutted relation therewith and atomically butt welded thereto as shown in fragmentary detail, Fig. 12, to complete the container.

As shown in Fig. 12 the end sections, such as 12, are of such size as to have their outer wall surfaces substantially flush in relation with the outer wall surfaces of the central section 25 when the sections are abutted, whereby the outer container wall presents a substantially smooth surface, the joint preferably being finished by grinding to remove the irregularities such as an outwardly extending welding seam rib, if formed.

I claim:

1. A method of constructing a single wall container which comprises forming a pair of cup shaped end sections of substantial length, a cylindrical center section by shaping a strip of metal into a cylindrical ring by abutting and welding the ends thereof, forming a girth band by shaping a strip of metal into a cylindrical ring by abutting and welding the ends thereof, die expanding said ring into approximately its final form, cold rolling said ring to finished shape, die expanding said ring in its finished shape to its finished diameter, forming a transversely split reinforcing ring with offset end portions adapted to receive bowed connector plates, welding a bung support ring to said split ring with the said bung ring extending radially inwardly from the bung ring, contracting by collapsing said reinforcing ring and inserting and positioning it within the girth band, locking said ring in such position by said connector plate, expanding the said reinforcing band into pressure engagement with the girth band by removing the bow in said plate by the application of pressure to said bow, stitch welding the girth band to the said reinforcing ring in the area adjacent said bung support ring, applying the above assembly of girth band and reinforcing ring over said center section, expanding the central portion of said center section into said girth band with marginal areas of the center section extending beyond and snugly engaging the marginal areas of the girth band, bonding the marginal edges of said girth band and said center section together by electric seam welding throughout said marginal edges, trimming off by grinding said marginal portions through said seam welding, forming a bung aperture by punching out the areas within said bung supporting ring, inserting a bung insert in said bung aperture and sealing said insert to said girth band center section, abutting the edges of said open end sections flush against the edges of the said girth band and joining by automically welding the said sections thereto to complete the container.

2. In the method of constructing a girth band for a container of the class described consisting of the steps of shaping a strip of metal into a cylindrical ring by abutting and welding the ends thereof, die expanding said ring into approximately its final form, cold rolling said ring to finished shape, die expanding said ring in its finished shape to its finished diameter, forming a transversely split reinforcing ring with offset end portions adapted to receive bowed connector plates, welding a bung support ring to said split ring with the said bung ring extending radially inwardly from said split ring, contracting said reinforcing ring and inserting and positioning it within the girth band, locking said ring in such position by said connector plate, expanding the said reinforcing band into pressure engagement with the girth band by removing the bow in said plate by the application of pressure to said bow, stitch welding the girth band to the said reinforcing ring in the area adjacent said bung support ring, forming a bung aperture by punching out the areas of metal within said bung supporting ring, inserting a bung insert in said bung aperture and sealing said insert to said girth band.

3. A method of constructing a single wall container which comprises forming a pair of cup shaped end sections of substantial length, a cylindrical center section by shaping a strip of metal into a cylindrical ring by abutting and welding the ends thereof, forming a girth band by shaping a strip of metal into a cylindrical ring by abutting and welding the ends thereof, die expanding said ring into approximately its final form, cold rolling said ring to finished shape, die expanding said ring in its finished shape to its finished diameter, applying the girth band over said center section, expanding the central portion of said center section into said girth band with marginal areas of the center section extending beyond and snugly engaging the marginal areas of the girth band, bonding the marginal edges of said girth band and said center section together by welding throughout said marginal edges, trimming off by grinding said marginal portions through said seam welding, abutting the edges of said open end sections flush against the edges of the said girth band and joining by welding the said sections thereto.

MAX O. KUHN.